No. 613,506. Patented Nov. 1, 1898.
J. H. FRYE.
VETERINARY TOOTH CUTTER.
(Application filed Dec. 18, 1897.)
(No Model.)
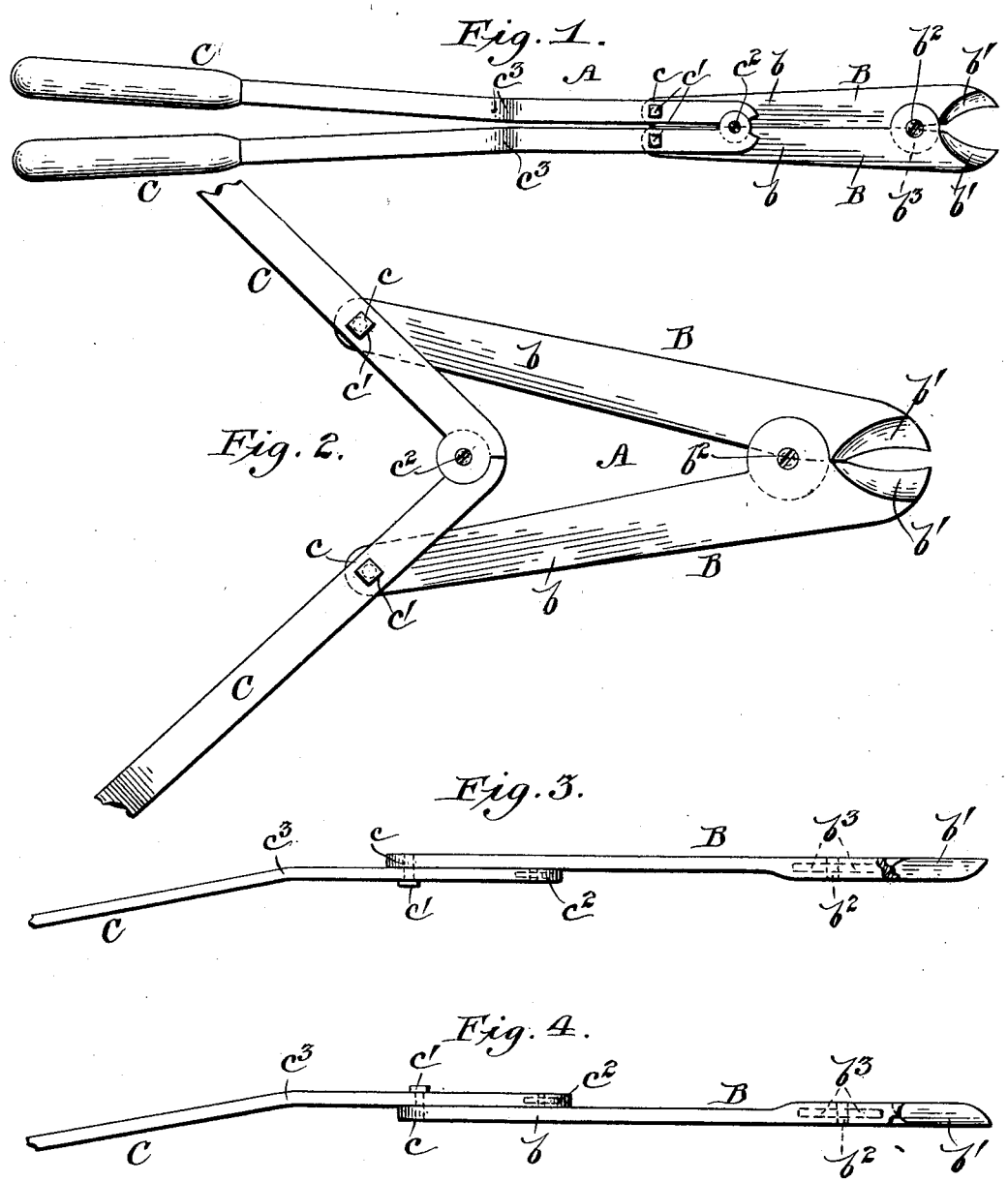
WITNESSES
INVENTOR
John H. Frye

UNITED STATES PATENT OFFICE.

JOHN HENRY FRYE, OF TAYLOR'S FALLS, MINNESOTA.

VETERINARY TOOTH-CUTTER.

SPECIFICATION forming part of Letters Patent No. 613,506, dated November 1, 1898.

Application filed December 18, 1897. Serial No. 662,449. (No model.)

*To all whom it may concern:*

Be it known that I, JOHN HENRY FRYE, a citizen of the United States, residing at Taylor's Falls, in the county of Chisago and State of Minnesota, have invented certain new and useful Improvements in Veterinary Tooth-Cutters; and I do hereby declare the following to be a full, clear, and exact description of the invention, such as will enable others skilled in the art to which it appertains to make and use the same.

My invention relates to improvements in cutters, and more particularly to that class of cutters which are adapted to cut the teeth of animals.

It consists in providing levers pivoted together, with cutting edges at one end and handles at the other end, and in so constructing the said handles that they will project beyond their pivotal connection with the said levers and form a toggle-joint between the ends of the said levers to force them open.

It also consists in certain other constructions, combinations, and arrangements of parts, as will be hereinafter more fully described and claimed.

In the accompanying drawings, Figure 1 represents a plan view of my improved cutter. Fig. 2 represents a plan view of the same, the handles being forced apart to close the jaws of the cutter. Fig. 3 represents a side elevation showing the handles adjusted in position with relation to the cutting-jaws for cutting an upper tooth; and Fig. 4 represents a similar view, but with the handles adjusted for cutting a lower tooth.

A in the drawings represents my improved cutter, B B jaws or cutting-levers, and C C handles for operating the same.

Cutters of this kind are generally used by veterinary surgeons for cutting the teeth of horses and when used for this purpose are required to be adapted for ready insertion into the mouths of the animals and capable of bringing the cutting-surfaces against the teeth with great power, so that the operation can be quickly and yet effectively accomplished. With these objects in view I have conceived the idea of producing a cutter such as that illustrated in the drawings, in which the cutting-jaws B B are provided with lever end portions $b\, b$ of considerable length, the cutting-jaws $b'\, b'$ being comparatively short, it only being required that they shall be of sufficient length to well cover any tooth to be cut. These cutting edges $b'\, b'$ are preferably beveled upon one side only, as seen in the drawings, and are also made slightly curved, so as to surround the tooth to some extent. As seen in Fig. 2 of the drawings, the cutting edges of the jaws do not quite touch when closed. The levers B B are pivoted at $b^2$ a short distance to the rear of the cutting edges. While I may use any kind of pivotal joint, yet I prefer to use that illustrated in the drawings, in which a tongue or extension, as $b^3$, formed upon one of the levers B, extends between corresponding tongues or extensions formed upon the opposite lever, a pivotal bolt or screw being passed through the same and securing them together. A pivot of this character, while very strong, can be readily taken apart if occasion should require it. The handles C C are made of suitable length and are preferably slightly separated when in their closed position, so as to allow the fingers of the operator to easily pass between the same when grasping the handles. The handles C C are pivoted to the rear ends of the jaws B B, as at $c\, c$, by means of bolts, as $c'\, c'$. These bolts are preferably screw-bolts and adapted to be easily removed, so that the handles may be taken off and adjusted, as will be hereinafter more fully described.

The handles C extend beyond the pivotal point $c$ and are connected together at their ends by means of a pivotal joint, as at $c^2$. This joint $c^2$ is preferably made like the pivotal point at $b^2$. It will be observed from the drawings that by this arrangement the handles C are not only connected to the ends of the jaws, but extend beyond their pivotal point and form a toggle between the joints, whereby they may be forced apart and bring the cutting edges of the said jaws together. I find that by this construction I am enabled to obtain great power for bringing the cutting edges together. I find that also by placing the handles so that they must be pulled apart to perform the cutting operation gives the operator a much larger percentage of power with the instrument than if the levers were required to be brought together to perform the cutting operation. In operating upon an animal with my improved cutter the operator can step a little to one side of the front of the animal, and pulling with one hand and pushing with the other he cannot fail to produce the desired effect upon the tooth, as he is in position to bring almost any kind of power upon the cutting-jaws. The handles C C are also preferably slightly bent, as at $c^3$, so that the larger portion of their length is not in the same plane with the cutting-jaws. By forming the handles in this way I am enabled to use the instrument upon teeth which would be very difficult to cut if straight handles were employed. In operating upon the teeth of horses the front teeth are nearly always so arranged with respect to the rear teeth that straight handles would come in contact with the said front teeth and prevent the jaws being placed so as to produce a square cut upon any one of the rear teeth.

In a cutter for use in cutting the teeth of horses the handle should nearly always be bent slightly downward, whether cutting the upper or the lower teeth, on account of the usual formation of horses' mouths. In order to arrange the handles in this way and still present the cutting edge of the jaws to the teeth, I adjustably secure the handles to the said jaws by means of screw-bolts $c$ $c$. As illustrated in Fig. 3 of the drawings, the handles are adjusted upon the under side of the jaws B, the cutting edge $b'$ of the cutters being upon the upper side and in position for cutting a tooth in the upper jaw of the horse. When desired to cut a tooth in the horse's lower jaw, the handles can be readily removed and secured to the other side of the jaw and so that they would still be bent downwardly and present the cutting edge $b'$ to the tooth on the lower jaw, as illustrated in Fig. 4 of the drawings. Repeated experiments have shown that this adjustment is a very valuable improvement upon veterinary tooth-cutters. The handles, as shown in the drawings, are preferably always secured to the opposite side of the cutters from the cutting edges thereof and always bent downwardly unless through some malformation of the animal to be operated upon it is desired to have them bent upwardly, when they can be so adjusted. In general practice, however, it will be found that they should nearly always be bent downwardly.

Besides the advantages in power gained by arranging the handles as above described, so that they are pushed apart in the act of cutting, there are also other advantages derived from this arrangement, especially in the fact that it gives the horse no chance to get his front teeth caught in the handles when the tooth is cut, as is often the case in the use of handles which are brought together in cutting. When the handles are arranged so as to be brought together to produce the cutting act, they have to be open wide enough and usually go into the mouth far enough to enable the horse to get his upper teeth between the handles as they are closed, which often causes injury to the teeth thus caught. In an instrument of that kind also there is great liability of lacerating the tongue or lips by catching them between these handles as they are closed. In my improved cutter it will be noticed that when in the act of cutting the tooth every part of the instrument is open except the cutting-jaws which are directly on the tooth to be cut. Hence there is no possible chance to injure any other tooth than the one to be cut and lacerate the tongue or lips in any manner. Another advantage from having handles closed when the cutters are open is that it gives the operator a better chance to insert the instrument into the mouth of the animal, and he can better direct the instrument and see his work than if the handles were spread apart.

The above-described constructions, it will be apparent, all contribute to produce a veterinary tooth-cutter of the most approved character and one which is capable of quick, easy, and powerful manipulation.

Having now described my invention, what I claim as new, and desire to secure by Letters Patent, is—

1. In a veterinary tooth-cutter, the combination of two handles pivoted together at their inner ends, and two cutting-jaws pivoted together intermediate their ends, and pivoted at their inner ends to the handles at points in rear of the pivot connecting the handles, said pivot being forward of the inner ends of the jaws, the said handles being slightly bent and adjustably secured to the ends of said levers, and the construction and arrangement being such that the cutting-jaws can be inverted and the handles secured on the top or bottom of the jaws, and upon forcing the handles apart, the said cutting edges will be brought together, substantially as described.

2. In a cutter, the combination with cutting-levers, of cutting-jaws formed thereon, bent handles adjustably pivoted to the said levers, the said handles extending between the said levers and being pivotally connected at their ends, the construction being such that in performing the cutting operation the operating parts will be forced open so as not to catch and lacerate any portion of the animal's mouth, substantially as described.

In testimony whereof I affix my signature in presence of two witnesses.

JOHN HENRY FRYE.

Witnesses:
ED. C. GOTTRY,
O. J. GRAY.